United States Patent Office 3,007,754
Patented Nov. 7, 1961

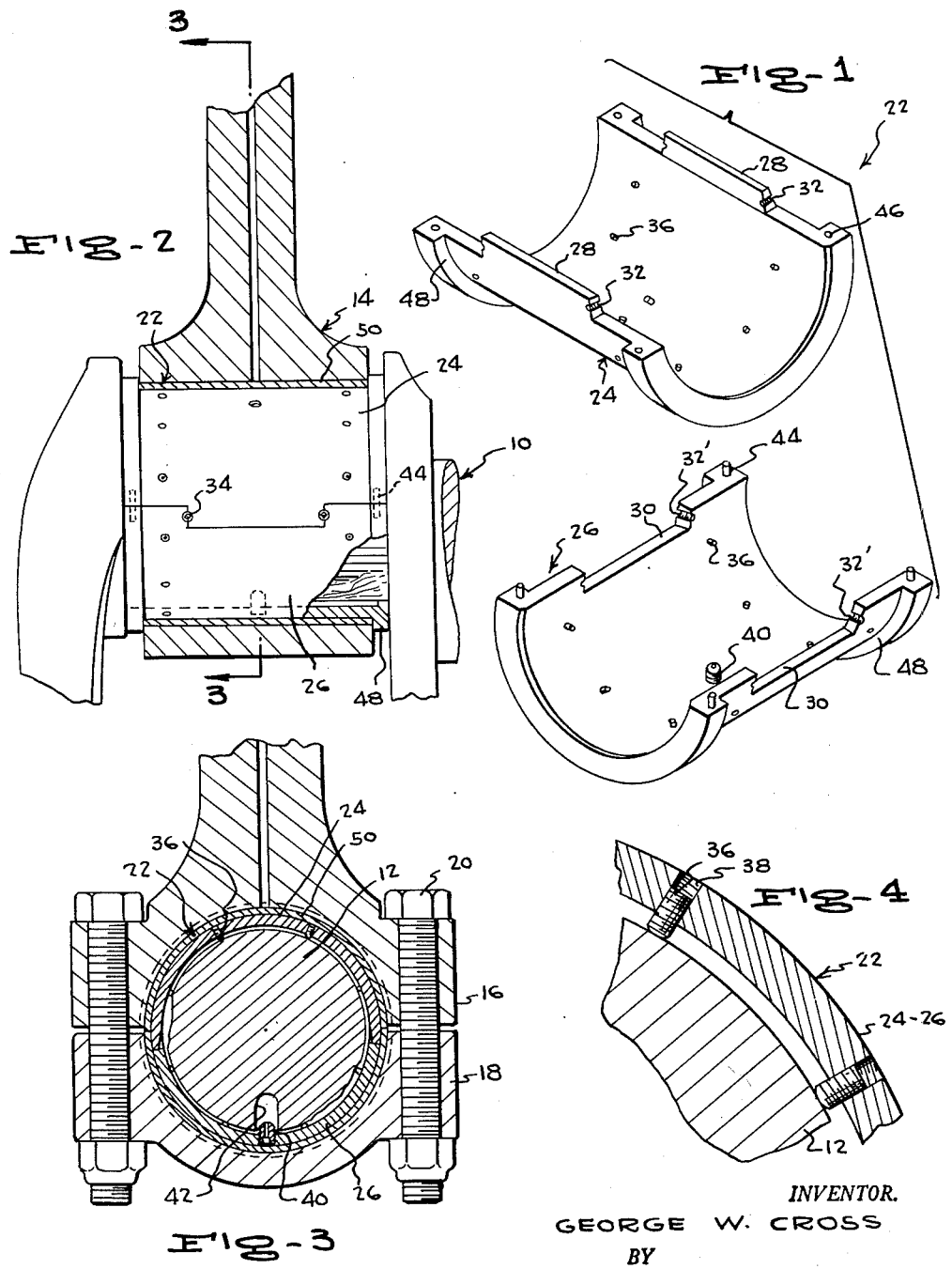

3,007,754
SHAFT BEARING
George W. Cross, 403 N. 8th St., Homer, La.
Filed Dec. 24, 1958, Ser. No. 782,799
4 Claims. (Cl. 308—237)

The present invention relates to a shaft bearing of the type embodying replaceable bearing surfaces which are attachable to main and crank pin journals of an automotive crankshaft.

Presently in use in modern high speed automotive internal combustion engines are main and crank pin bearings of the replaceable type each in the form of two semi-cylindrical half sections fabricated of rigid backing metal, such as steel, bronze, or the like, and having a lining of a conventional alloy suitable as a bearing surface, such as babbitt metal. The engine main bearings are generally provided with semicylindrical bearing caps forming a bore for the assembled main bearing half sections and each of the connecting rods of the engine is similarly provided with semicylindrical bearing caps, one removable from the other, forming another bore for the crankshaft journal bearing half sections. The half section main and crank pin bearings are anchored in the main and connecting rod bearing caps and the crankshaft main journals and connecting rod journals rotate therein. The main journals and connecting rod journals are hardened while the bearing half sections are fabricated of material having softer bearing qualities.

After extended use, the main and connecting rod journal half section bearings must be replaced due to wear or overloading. Frequently, the hardened crankshaft main and connecting rod journals are damaged due to the bearing failure or overheating and replacement of such bearing half sections is impractical for the reason that the replaced bearing half sections fail to fit the damaged or worn crankshaft main and connecting rod journals in a satisfactory manner.

An object of the present invention is to provide a replaceable shaft bearing which may be employed with a crankshaft main or connecting rod journal which is worn to an out-of-round condition and which when installed upon the main or connecting rod journal serves to efficiently support the main or connecting rod bearing caps for free and trouble-free operation.

Another object of the present invention is to provide a bearing for the shaft of an internal combustion engine which lends itself to installation on the journal of the shaft with ease and facility.

A further object of the present invention is to provide replaceable bearing half sections for the crankshaft of an engine which has means for locking the half sections around the crankshaft journals.

A still further object of the present invention is to provide crankshaft bearing half sections which are sturdy in construction, simple in structure, economical to fabricate, and ones which are highly effective in action.

These and other objects and advantages of the present invention will be fully apparent from the following description when taken in conjunction with the annexed drawing, in which:

FIGURE 1 is an isometric exploded view of a pair of bearing half sections fabricated according to the present invention;

FIGURE 2 is a view partially in section of an engine crankshaft crank pin with one end portion of a connecting rod rotatably supported thereon, with the bearing half sections of the present invention installed therein;

FIGURE 3 is a view taken on the line 3—3 of FIGURE 2; and

FIGURE 4 is a fragmentary sectional view showing the contacting engagement of the support elements with the crankshaft journals, the support elements being employed with the bearing half sections of the present invention for securement of the half sections to the journals.

Referring in greater detail to the drawing in which like numerals indicate like parts throughout the several views, the reference numeral 10 designates generally a portion of an automotive crankshaft, specifically the portion of the crankshaft adjacent one of the connecting rod journals, the latter being designated in FIGURE 3 by the reference numeral 12.

The reference numeral 14 designates generally the larger end of a connecting rod. The connecting rod has a pair of mating caps 16 and 18 secured together by bolt and nut assemblies 20, as in FIGURE 3. The bearing of the present invention is designated generally by the reference numeral 22 in FIGURES 2, 3 and 4.

The bearing 22 of the present invention is shown in disassembled isometric view in FIGURE 1 and consists in a pair of semicylindrical half sections 24 and 26 adapted to be circumposed in face to face abutting relation about the journal 12 of the crankshaft 10. The half sections 24 and 26 are also adaptable for use on a main bearing journal of the crankshaft 10, although here illustrated as installed on and adapted to be installed upon the connecting rod journal. In either case, the construction of the sections 24 and 26 is identical.

Cooperating interengaging means is provided on the abutting faces of the sections 24 and 26 for holding the sections 24 and 26 in assembled relation when circumposed about the journal 12. This means consists in a tongue 28 on each end of the section 24 and a recess formed on each end of the section 26. The tongues 28 and recesses 30 are on the abutting faces of the sections 24 and 26, respectively. Releasable locking means is provided for securing each tongue 28 in the respective recess 30 when the sections 24 and 26 are in the circumposed position assembled about the shaft journal 12. This locking means consists in a tapped bore provided in the meeting line of the end of each tongue 28 with the adjacent wall of the recess 30 as at 32 and 32' in FIGURE 1. Each half of the bore 32, 32' may be formed in the respective bearing section 24, 26, when the latter is fabricated or the bore may be constructed by drilling and tapping through the meeting line of the assembled sections 24 and 26 at the ends of the tongues 28. When the tongues 28 are received within their respective recesses 30, a suitable set screw or Allen screw may be used in each of the locking bores for securing the sections 24 and 26 together in assembled relation. Such Allen screws are shown in FIGURE 2 and designated by the numeral 34.

A plurality of supporting elements, each constituting another Allen screw 36, are arranged in spaced relation about each of the sections 24 and 26 and each is rotatably supported in the adjacent section for adjusting movement relative into and out of contacting engagement with the shaft journal 12 when the sections 24 and 26 are in their circumposed position about the shaft journal 12. Each Allen screw 36 is mounted in a tapped bore 38 in the respective section 24, 26 with the wrench end facing outwardly of the respective section 24, 26, as shown in FIGURE 4.

A hollow Allen screw 40 is threaded in a tapped bore provided in the one section 26, as in FIGURE 3, and is of a length such as to extend into and to plug the opening 42 in the journal 12 which is provided for the lubrication of bearings on the journal 12. The hollow screw 40 permits flow of oil from the opening 42 into the space between the exterior surface of the sections 24 and 26 and the adjacent inner surface of the bearing caps 16 and 18 of the bearing member or connecting rod 14.

Positioning pins 44 project from the ends of the section 26 and are received in complementally arranged openings 46 and the ends of the section 24 for aligning the sections together when they are assembled about the journal 12.

Each of the sections 24 and 26 is provided on its ends with a flange 48 adapted to overlie the bearing shell 50 on the inner surfaces of the caps 16 and 18 of the connecting rod end 14. This prevents side movement of the connecting rod caps 16 and 18 relative to the journal 12.

In use, the bearing half sections 24 and 26 may be installed upon the crankshaft journal 12 with the pins 44 received in the openings 46 and with Allen screws 36 each moved outwardly in its bore 38 so as to be free of the surface of the journal 12. Next, the set screws 34 are inserted and rotated in the bores formed in the meeting edges of the tongues 28 and the adjacent walls of the recesses 30. The set screws 36 are next adjusted inwardly by rotating them until their free ends come into contacting engagement with the surface of the journal 12, as in FIGURE 4. The set screws 36 may be adjusted relative to each other as to account for any unevenness in the surface of the journal 12 to thereby support the sections 24 and 26 on the journal 12 and form a means for mounting the bearing caps 16 and 18 of the main bearing or connecting rod bearing, as the case may be.

As will be noted in FIGURE 1, the inner free edge of the tongues 28 is tapered so as to provide clearance for movement over the center of the respective journal on which the sections 24 and 26 are circumposed.

It is intended that the outer surface of each of the sections 24 and 26 between the flanges 48 is polished to a high degree of polish or to be lined with a bearing surface so as to provide a frictionless surface for rotation thereon of the bearing caps 16 and 18 with their softer or harder bearing. The sections 24 and 26 may be provided on their outer surfaces with polished bearing surfaces or lined with a bearing surface, and the bearing caps 16 and 18 may be lined with a bearing surface, or polished to a high degree of polish, as desired.

It will be seen therefore that the bearing of the present invention provides a means for repairing the bearings, both main and connecting rod, of an internal combustion engine in which damage has been suffered to the journals of such bearings and replacement of the bearing liners or bearing surfaces is advisable.

What is claimed is:

1. A bearing for a shaft comprising a pair of semi-cylindrical half sections adapted to be circumposed in face to face abutting relation about a shaft, cooperating interengaging means on the abutting faces of said sections for holding the sections in assembled relation when circumposed about said shaft, releasable locking means securing said interengaging means together, and a plurality of supporting elements arranged in spaced relation about each of said sections and supported in each section for adjusting movement relative to said shaft when the sections are in circumposed position about said shaft.

2. A bearing for a shaft comprising a pair of semi-cylindrical half sections adapted to be circumposed in face to face abutting relation about a shaft, a tongue on the abutting face of one of said sections and interengageable with a recess formed on the abutting face of the other of said sections when the sections are in circumposed position about said shaft for holding the sections in assembled relation when circumposed about said shaft, a plurality of supporting elements arranged in spaced relation about each of said sections and supported in each section for adjusting movement relative to said shaft when the sections are in circumposed position about said shaft, and releasable locking means securing said tongue in said recess when the sections are in circumposed position about said shaft.

3. A bearing for a shaft comprising a pair of semi-cylindrical half sections adapted to be circumposed in face to face abutting relation about a shaft, cooperating interengaging means on the abutting faces of said sections for holding the sections in assembled relation when circumposed about said shaft, releasable locking means securing said tongue in said recess when the sections are in circumposed position about said shaft, and a plurality of screws arranged in spaced relation about each of said sections and rotatable in bores formed in each section for movement into contacting engagement with said shaft when the sections are in circumposed position about said shaft.

4. The combination with a shaft, of a bearing assembly comprising a pair of semi-cylindrical half sections circumposed in face to face abutting relation about said shaft, cooperating interengaging means on the abutting faces of said sections holding the sections in assembled relation on said shaft, releasable locking means securing said tongue in said recess when the sections are in circumposed position about said shaft, a plurality of supporting screws arranged in spaced relation about each of said sections and rotatable in bores formed in each section into contacting engagement with said shaft, and a bearing member circumposed about said sections and rotatably supported thereon.

References Cited in the file of this patent

UNITED STATES PATENTS

| | | |
|---|---|---|
| 2,026,261 | Vigne | Dec. 31, 1935 |
| 2,481,931 | Kester | Sept. 13, 1949 |
| 2,594,587 | Riordan | Apr. 29, 1952 |
| 2,740,274 | Lebocey | Apr. 3, 1956 |
| 2,762,117 | Houck | Sept. 11, 1956 |